(12) United States Patent
Flick et al.

(10) Patent No.: US 9,913,557 B2
(45) Date of Patent: Mar. 13, 2018

(54) MULTI-SIZE CARTRIDGE EXTRACTION UNIT HAVING GUIDING SLIDES

(71) Applicant: NESTEC S.A., Vevey (CH)

(72) Inventors: Jean-Marc Flick, Pomy (CH); Enzo Bonacci, Savigny (CH); Antoine Ryser, Lausanne (CH)

(73) Assignee: Nestec S.A., Vevey (CH)

( * ) Notice: Subject to any disclaimer, the term of this patent is extended or adjusted under 35 U.S.C. 154(b) by 352 days.

(21) Appl. No.: 14/433,918

(22) PCT Filed: Oct. 7, 2013

(86) PCT No.: PCT/EP2013/070780
§ 371 (c)(1),
(2) Date: Apr. 7, 2015

(87) PCT Pub. No.: WO2014/056821
PCT Pub. Date: Apr. 17, 2014

(65) Prior Publication Data
US 2015/0272376 A1    Oct. 1, 2015

(30) Foreign Application Priority Data
Oct. 9, 2012   (EP) ..................................... 12187716

(51) Int. Cl.
*A47J 31/40*   (2006.01)
*A47J 31/36*   (2006.01)
(52) U.S. Cl.
CPC ......... *A47J 31/407* (2013.01); *A47J 31/3633* (2013.01)

(58) Field of Classification Search
CPC combination set(s) only.
See application file for complete search history.

(56) References Cited

U.S. PATENT DOCUMENTS

| 4,846,052 A | * | 7/1989 | Favre ................. | A47J 31/3695 99/295 |
| 7,798,055 B2 | * | 9/2010 | Mandralis ........... | A47J 31/0673 99/284 |
| 8,431,175 B2 | * | 4/2013 | Yoakim .................. | A47J 31/22 426/431 |
| 2004/0031394 A1 | * | 2/2004 | Yoakim ................ | A47J 31/0668 99/279 |
| 2009/0126578 A1 | * | 5/2009 | Amann ................ | A47J 31/3623 99/295 |
| 2012/0171334 A1 | * | 7/2012 | Yoakim ................... | A47J 31/22 426/87 |

FOREIGN PATENT DOCUMENTS

| EP | 1721553 | 11/2006 |
| WO | 2012020343 | 2/2012 |

* cited by examiner

*Primary Examiner* — Anne M Antonucci
*Assistant Examiner* — Renee LaRose
(74) *Attorney, Agent, or Firm* — K&L Gates LLP (57) ABSTRACT

An extraction unit (10) for extracting cartridges (1*a*;1*b*) of two different dimensions (da,ha;db,hb) comprises a seat (14,20) for receiving any of such cartridges (1*a*;1*b*) and for extraction thereof in the seat. The unit (10) further comprises a pair of slides (19*a*) for guiding any of such cartridges (1*a*;1*b*) towards the seat (14,20) in a sliding contact of each of these slides (19*a*) with a cartridge guide (5*a*;5*b*) of the cartridges (1*a*; 1*b*). The slides are relatively movable to be spaced selectively by a first and second distance (Da, Db) according to the size (da, db) of the cartridge.

17 Claims, 8 Drawing Sheets

MULTI-SIZE CARTRIDGE EXTRACTION UNIT HAVING GUIDING SLIDES

CROSS REFERENCE TO RELATED APPLICATIONS

The present application is a National Stage of International Application No. PCT/EP2013/070780, filed on Oct. 7, 2013, which claims priority to European Patent Application No. 12187716.1, filed on Oct. 9, 2012, the entire contents of which are being incorporated herein by reference.

FIELD OF THE INVENTION

The present invention relates to an extraction unit using cartridges that contain a beverage ingredient for preparing a beverage. The extraction unit is arranged for receiving cartridges of different sizes. The invention also relates to a combination of such an extraction unit with a cartridge and a use of a cartridge for such an extraction unit.

For the purpose of the present description, a "beverage" is meant to include any liquid food, such as tea, coffee, hot or cold chocolate, milk, soup, baby food, etc. . . . A "cartridge" is meant to include any pre-portioned beverage ingredient within an enclosing packaging of any material, in particular an airtight packaging, e.g. plastic, aluminium, recyclable and/or biodegradable packagings, and of any shape and structure, including soft pods or rigid capsules containing the ingredient.

BACKGROUND ART

One problem encountered is the positioning of the cartridge in the device and the closing of the latter around the cartridge to perform the brewing process. The cartridge usually has to be positioned by the user on a cartridge support or in a housing, then the device is closed manually or automatically around the cartridge.

It is important to correctly position the cartridge so that the device closes correctly around the latter and a good seal is thus achieved to ensure good conditions of extraction. Bad positioning may damage the cartridge, and thus affect the conditions of extraction. The loading of the cartridge must also be easy, without trial and error as to the correct position of the cartridge in the device. The loading must also be as rapid as possible and not require excessive manipulations. Hence, devices exist that propose the insertion of the cartridge in a vertical plane and the movement of the extraction or infusion parts along a horizontal plane around the cartridge. Such systems have the advantages of allowing a loading from the top piggy-bank fashion, and makes for rapid loading. The positioning of the cartridge is then taken over by the movement of a movable part that pushes the cartridge against another part such as a water heater. However, these devices are complex to produce and are not suitable for low-cost and therefore entry-level coffee machines for the consumer market. They are therefore usually intended for the business market such as restaurants, bars or communities. For example, patent application WO 98/47418 relates to a device for the extraction of pre-measured inserts in which the inserts are inserted vertically and are extracted horizontally. The disadvantage of this device is that it comprises two movable parts for the extraction, which makes the mechanical principle more complicated.

WO 2005/004683 relates to a cartridge brewing device comprising: a first part; a second part that can be moved relative to the first part; a housing for the cartridge and defining, in a closed position of the movable part against the fixed part, an extraction position of the cartridge along an axis in said housing; an insertion and positioning part comprising means for guiding the cartridge arranged so as to insert the cartridge by gravity and position such cartridge in an intermediate position; a drink pouring system; and the second movable part is so arranged and constructed to move the cartridge from the intermediate position into the extraction position when the device is closed.

EP 1 721 553 discloses a brewing unit for coffee machines using cartridges. The unit has a front part with a beverage outlet and a rear part with a hot water inlet. The front part and the rear part are mounted in-between a pair of facing shoulder guide members. The front part is movable in-between these guide members to be urged against the rear part so as to form with the rear part a brewing chamber for accommodating a cartridge to be extracted, whereby an unoccupied volume is left in front of the front member between the guide members within the machine.

EP 1 659 547 relates to a beverage machine for making infusions, in particular, espresso coffee. The machine includes an infusion chamber within a brewing unit that has a movable front part with a return spring and a beverage outlet duct that extends through the assembly's outer housing. The movable front part cooperates with a rear part that is movable within the housing and that can be pushed against the movable front part to compress the return spring whereby the outlet duct slides through the assembly's outer housing. The cartridge is passed through the external housing to the infusion chamber via a rigid cartridge feed channel and then the cartridge is transferred into the infusion chamber by an external bushing on the movable rear part of the brewing unit which is provided with a cam-like path for moving the rear part. This arrangement involves several problems. The cartridge must be moved during the closure of the brewing chamber and this can cause blocking and it also makes the retaining means of the pod more complex. Moreover, opening and closing the brewing chamber involves simultaneously a linear displacement of the movable rear part within the housing, of the movable front part within the housing and of the outlet duct through the housing which increases the risk of hyper-guiding and jamming or improper alignment of the various parts that linearly move one relative to another. The fluid system comprises a moving assembly which makes the fluid system more complex to assemble. When upon extraction brewing unit is re-opened for removing the cartridge, pressurized water contained within the infusion chamber may project outside the housing. Furthermore, an unoccupied volume is left within the machine between the front member and the casing when the outlet duct is in its retracted position.

U.S. Pat. No. 3,260,190 and WO 2005/072574 disclose a coffee machine having a removable drawer for positioning a coffee can therein. The drawer can be slid horizontally into the coffee machine and lifted towards a water injection arrangement. WO 2006/023309 discloses a coffee machine with a slidable drawer for the introduction of a coffee cartridge into the machine. The drawer is movable between an open and a closed position and has two cartridge half-shells that are pivotable against each other to form a brewing chamber when the drawer is in the closed position and pivotable apart when the drawer is slid out from the machine. U.S. Pat. No. 6,966,251 discloses a coffee machine having a horizontally slidable drawer for positioning a cartridge therein. When slid into the machine, the drawer can be moved upwards towards a fixed cartridge cage for form a brewing chamber for a cartridge. EP 1 566 126 discloses a coffee machine with a vertical brewing unit for accommodating coffee pods. The brewing unit has a fixed upper part and a movable lower part for holding a pod and that can be pulled up for closing the brewing unit and let down for inserting or removing a pod.

Further brewing units are disclosed in EP 0 730 425, EP 0 862 882, EP 1 219 217, EP 1 480 540, EP 1 635 680, EP 1 669 011, EP 1 774 878, EP 1 776 026, EP 1 893 064, FR 2 424 010, U.S. Pat. No. 3,260,190, U.S. Pat. No. 4,760,774, U.S. Pat. No. 5,531,152, U.S. Pat. No. 7,131,369, US 2005/0106288, US 2006/0102008, WO 2005/002405, WO 2005/016093, WO 2006/005756, WO 2006/066626 and WO 2007/135136.

A beverage preparation machine arranged to handle ingredient cartridges of different sizes is disclosed in EP 1 208 782.

SUMMARY OF THE INVENTION

One aspect of the present invention relates to an extraction unit for extracting cartridges of two different dimensions. The unit comprises a seat for receiving any of such cartridges for extraction thereof in the seat. Optionally, the seat is delimited by a first part and second part that are relatively movable between a cartridge extraction position and a cartridge loading and/or ejection position.

In accordance with the invention, such unit further comprises a pair of slides for guiding any of such cartridges towards the seat in a sliding contact of each of the slides with a cartridge guide of the cartridges.

The slides can be configured to guide in sliding contact the cartridge guide in the form of at least one guide edge of the cartridges, e.g. a protruding cartridge flange or rim.

The slides may be configured so that:
  each of the slides forms a recess for receiving a guide edge protruding from the cartridges;
  each of said slides forms a protrusion for being received in a guide edge recessed in the cartridges; or
  one of the slides forms such a recess and another of the slides forms such a protrusion.

The slides can be relatively movable to be spaced apart selectively by:
  a first distance for guiding towards the seat a first cartridge of these cartridges having a cartridge guide of such first size as to be in sliding contact with both slides when spaced by the first distance; and
  a second distance for guiding towards the seat a second cartridge of the cartridges having a cartridge guide of such a second size as to be in sliding contact with both slides when spaced by said second distance.

In this case, the first distance and the first size are different, respectively, to the second distance and the second size.

At least one of the slides can be delimited by a member that is movable relative to the other slide by an actuator in accordance with the size of the cartridge guide of the cartridge to be guided by the slides. The member may be pivotable about an axis to move the slides together and apart. This axis may be generally parallel to a direction of sliding along the slide. For instance, the actuator comprises a cam system. The cam system may include a pivotable cam acting on a cam follower fixed or integral with this member. Each slide may be delimited by a respective member that has a cam follower, the pivotable cam acting on the cam of each member. The or each cam follower can be urged against the cam by a biasing spring. The cam system can comprise a transmission member integral or fixed to the cam and having a connector engaging with a slide selector. The slide selector can be movable, in particular rotatable, between a first selector position corresponding to a selection of the first distance spacing the slides and a second selector position corresponding to a selection of the second distance spacing the slides. Optionally, the connector forms a connector pin engaging with a selector channel or forming a connector channel engaging with a selector pin.

In one embodiment, the slide selector is movable, in particular translationally, between an active selector position for selecting selectively the first and second distances spacing the slides and an inactive selector position in which the slide selector is disengaged from the connector of the transmission member. Optionally, the connector forms: a connector pin engaging with a selector channel having an open end out of which the connector pin escapes when the slide selector is moved to the inactive position and into which the connector pin enters when the slide selector is moved to the active selector position; or a connector channel engaging with a selector pin, the connector channel having an open end out of which the selector pin escapes when the slide selector is moved to the inactive position and into which the selector pin enters when the slide selector is moved to the active selector position. The cartridge seat may be delimited by a first part and second part that are relatively movable between a cartridge extraction position and a cartridge loading and/or ejection position, one of the delimiting parts comprising the slide selector. The slide selector can be movable, when the first and second delimiting parts are in the loading and/or ejection position, between: a first selector position corresponding to a selection of the first distance spacing the slides; and a second selector position corresponding to a selection of the second distance spacing the slides.

The cartridge seat can be delimited by a first part and second part that are relatively movable between a cartridge extraction position and a cartridge loading and/or ejection position. At least one of the delimiting parts, e.g. a delimiting part comprising a slide selector, has a first member and a second member that are relatively moved, e.g. in a telescopic manner, by a depth selector moving between first and second selector positions and vice versa, between:
  a first member position delimiting a cartridge cavity (cartridge receptacle) of a first depth for receiving a cartridge having a first height; and
  a second member position in which the cartridge cavity (cartridge receptacle) has a second depth different to the first depth for receiving a cartridge having a second height different to the first height (ha), Such depth selector may be fixed to or formed integrally with a slide selector.

In an embodiment, the cartridge seat is delimited by a first part and second part that are relatively movable between a cartridge extraction position and a cartridge loading and/or ejection position over a closure distance. At least one of the delimiting parts has a first member and a second member that are relatively moved, in particular in a telescopic manner, between: a first member position delimiting a cartridge cavity (cartridge receptacle) of a first depth for receiving a cartridge having a first height; and a second member position in which the cartridge cavity (cartridge receptacle) has a second depth different to the first depth for receiving a cartridge having a second height different to the first height. At least one of the delimiting parts has a shifter for compensating a displacement of the first and second members between the first and second member positions so as to maintain the closure distance for the first member position equal to the closure distance for the second member position. Optionally the shifter comprises a closure selector connected to an actuator for relatively moving the first and second parts between the cartridge extraction position and the cartridge loading and/or ejection position.

The invention also relates to combination of: an extraction unit having a seat and a pair of slides described above; and a cartridge having a cartridge guide and a dimension selected from at least two different dimensions of cartridges receivable in the seat. The combination is arranged so that the cartridge is guided by the slides towards the seat in a sliding contact of each of the slides with the cartridge guide of the cartridges. The cartridge may have a generally cup-shaped body, in particular a receptacle for containing an ingredient, that is extended on at least one side of the cartridge by a protruding cartridge guide. Normally, the cartridges of different dimensions differing by the dimensions of their cartridge guides and optionally by their heights.

A further aspect of the invention relates to a use, for providing a combination as described above, of a cartridge having a cartridge guide and a dimension selected from at least two different dimensions of cartridges receivable in such seat arranged so that the cartridge is guided by the slides towards the seat in a sliding contact of each of the slides with the cartridge guide of the cartridge.

Further features and advantages of the invention will appear in the description of the detailed description.

BRIEF DESCRIPTION OF THE DRAWINGS

The invention will now be described with reference to the schematic drawings, wherein:

FIGS. 6a to 7c show perspective views of a part of an extraction device in different configurations according to the invention.

DETAILED DESCRIPTION

A particular non-limiting embodiment of the invention is now described in relation with FIGS. 1 to 9.

The invention relates to a cartridge extraction device 10 and cartridges 1a and 1b of different dimensions da,ha;db,hb that can be handled and extracted by such device 10. Such device 10 may include a number of different elements 12-39 and a frame 11 for supporting such elements. Extraction device 10 may be mounted in a beverage preparation machine as known in the art, e.g. provided with the functionalities disclosed in WO 2009/074550, e.g. a fluid line, a pump, a temperature conditioner such as a heater and/or a cooler, a water tank or other ingredient feeder, a waste ingredient collector, etc . . . .

As illustrated in FIGS. 1a, 1b, 4 and 5 cartridges 1a;1b can have a cup-shaped receptacle 2a;2b that have a generally cylindrical or frusto-conical or frusto-domical shape, in particular combination of different sections with such shapes. Typically, receptacles 2a;2b have a frusto-conical obtuse bottom 3a;3b and a frusto-conical acute body extending from the bottom towards the mouth of receptacle 2a;2b. The mouth may be covered with a lid 4a;4b. The entire or only part of the lid may be applied to the receptacle; or the entire lid may be formed integrally with the receptacle. Such a lid, e.g. an aluminium or plastic foil, may extend laterally, typically beyond the mouth to form a flange 5a;5b. Cartridges 1a;1b may generally have a shape of revolution about a longitudinal axis 6a;6b. Cartridges 1a;1b have a height ha,hb and a diameter da;db of flange 5a;5b. Other cartridge shapes are also contemplated, in particular: the cartridge receptacle may be formed of a single section, e.g. (frusto-) conical, (frusto-)domical or cylindrical; the bottom may be generally flat or acute.

Figure 1A:
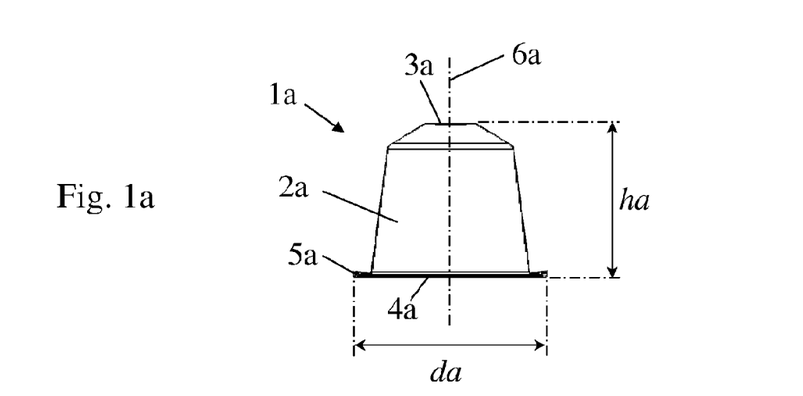
FIGS. 1a and 1b show two cartridges of different sizes for extraction in an extraction unit according to the invention.
Figure 1B:
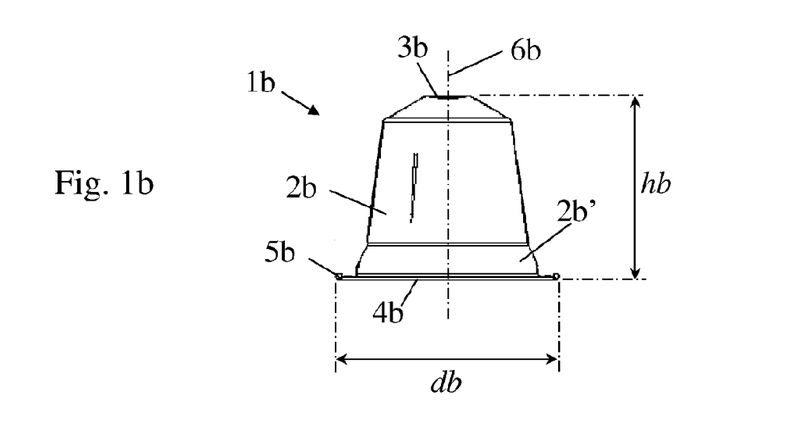
Figure 2:
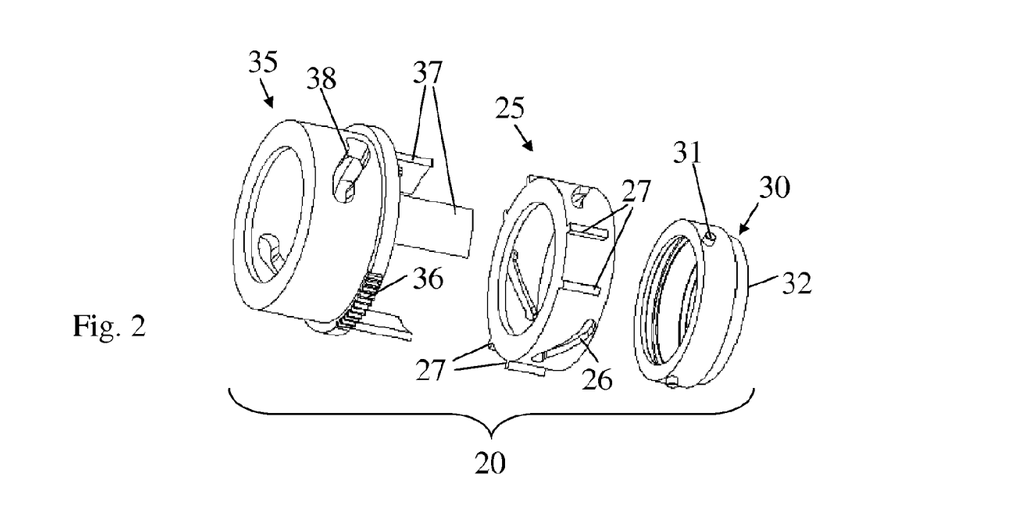
FIG. 2 is an exploded view of three elements of a delimiting part of a cartridge seat of an extraction unit according to the invention.

A cartridge 1a of small dimensions ha,da is illustrated in FIG. 1a. A cartridge 1b of large dimensions hb,db is illustrated in FIG. 1b. The height ha and the diameter da of cartridge 1a are smaller than the height hb and the diameter db, respectively, of cartridge 1b. Cartridge 1b has in particular an additional receptacle section 2b', e.g. of a generally frusto-domical shape. Such an additional receptacle section may of course have different shapes, for instance a shape in the continuity of the receptacle.

Cartridge 1b has a greater inner volume than cartridge 1a and has thus more space for containing an ingredient, e.g. a beverage ingredient such as coffee, tea, cocoa, milk, etc. . . .

For instance, cartridge 1a has a volume for containing 3-6 g ground coffee for the preparation on a ristretto or espresso coffee. Cartridge 1b may have a volume for containing 5-10 g ground coffee for the preparation of a lungo or americano coffee.

Cartridges 1a;1b may be used by circulating a liquid therethrough to mix it with an ingredient, e.g. a flavouring ingredient such as tea, coffee, cocoa, milk . . . and produce a beverage.

Liquid, e.g. heated or cold or cooled water, may be introduced at bottom 3a;3b, circulated inside the cartridge between the bottom and lid 4a;4b, e.g. generally along directions 6a;6b, and then collected at the lid, or vice versa.

The bottom and/or the lid of the cartridge may be opened or closed prior to use. When they are both opened, liquid is simply circulated through the cartridge, e.g. under pressure such as from above 1.5 bar to 25 bar, to form the beverage in the cartridge and collect it outside the cartridge. When the bottom and/or the lid is closed prior to use, the opening thereof may be achieved: prior to circulating the liquid, e.g. the bottom may be pierced by introducing appropriate piercing elements into the bottom prior to water circulation as for example disclosed in WO 02/00073 or in WO 02/35977; or under the effect of the circulating liquid, e.g. the lid may be torn open as for example disclosed in EP 512468 or in EP 512470.

An embodiment according to the invention of a cartridge extraction unit 10 and parts thereof with and without extractible cartridges 1a and 1b, is illustrated in FIGS. 2 to 9.

Exemplary extraction unit 10 has a seat 14,20 for receiving any of cartridges 1a;1b for extraction thereof in the seat. This seat is delimited by a first part 20,30,33 and second part 12,13,14 that are relatively movable between a cartridge loading and/or ejection position (FIGS. 4, 6a, 6b, 7a and 6) and a cartridge extraction position (FIG. 5).

For instance, extraction unit 10 comprises a piston-type extraction seat for a cartridge having its own sealing member, as for instance described in WO 2008/037642.

Parts 20,14 are mounted in a frame 11 as illustrated in FIGS. 6a to 7c. For example, frame 11 includes a pair of facing frame plates 11. One of or both parts 20,14 can be movably mounted to frame 11. For instance, first part 20 is movably mounted in frame 11 and second part 14 is fixedly mounted in frame 11.

Second part 14, e.g. an extraction plate that may include opening members for instance of the type disclosed in EP 512 470 or simply one or more fluid passages, may be secured in an opening 13 of a support 12 that is in turn secured to frame 11 at extremities 11c of frame arms 11b.

For example, cartridge 1a;1b comprises a cup 2a;2b and a closing membrane 4a;4b which is sealed on the cup for forming a gastight enclosure containing ground coffee. The membrane of the cartridge forms the beverage delivery side of the cartridge that is torn in contact with a puncture plate 14. Tearing of membrane 4a;4b can be obtained by the rise in pressure that takes place in cartridge 1a;1b during injection of water in the cartridge. Membrane 4a;4b of the cartridge is so perforated to provide many small apertures from which the beverage can be released.

Frame 11 may also include a fastening part 11a for securing frame 11 in a beverage preparation machine.

As illustrated in FIGS. 6a to 7c and 9, unit 10 also comprises a pair of slides 19a for guiding any of cartridges 1a;1b towards seat 14,20 in a sliding contact of each of said slides 19a with a cartridge guide formed by cartridge flanges 5a;5b of cartridges 1a;1b (FIGS. 1a and 1b).

Figure 9:
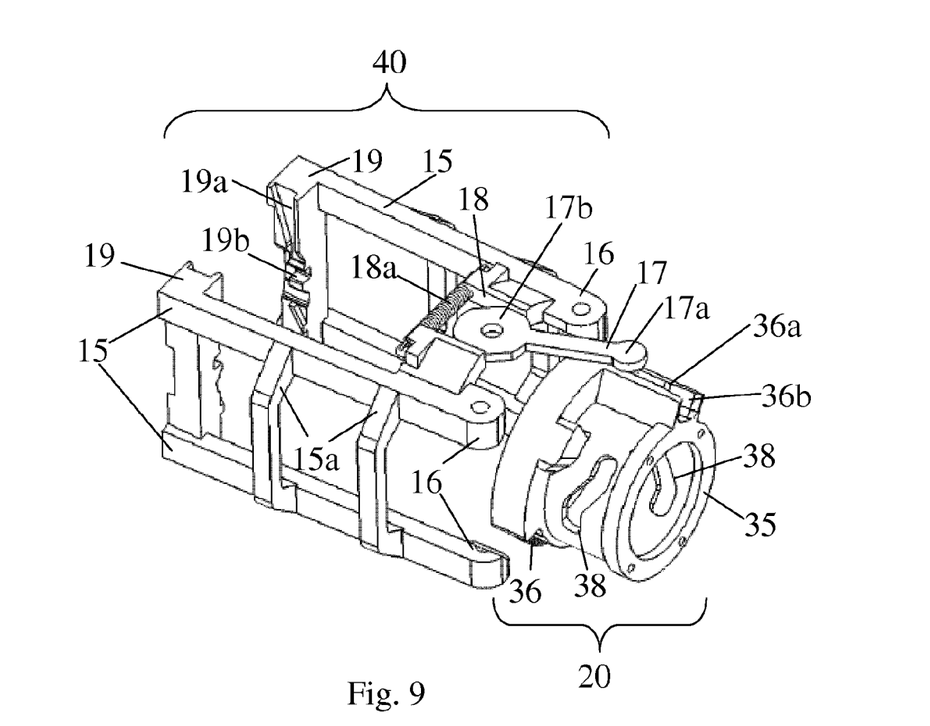

Slides 19a are configured to guide in sliding contact cartridge guide 5a;5b that are in the shape of a guide edge 5a;5b of cartridges 1a;1b.

Each of said slides forms a recess 19a for receiving a guide edge 5a;5b protruding from cartridge 1a;1b. Alternatively, each of slide forms a protrusion for being received in a guide edge recessed in the cartridge; or one of the slides forms a recess and another of the slides forms a protrusion.

As illustrated in FIGS. 6a to 7c and 9, recesses 19a are generally funnel-shaped to guide cartridge guide edges 5a;5b, typically under the effect of gravity, onto an intermediate stop member 19b. Such stop member may be fixed or movable, e.g. elastically movable, to slide 19 to stop cartridge 1a;1b upon introduction into recesses 19a in an intermediate position. By urging first and second parts 14,20 of unit 10 together, cartridge 1a;1b is relatively moved from the intermediate position into the extraction position.

In particular, cartridge 1a;1b may be relatively moved away from stop members 20 when first and second parts 14,20 are urged together so that cartridge 1a;1b does not rest anymore on stop members 19 when parts 14,20 are moved apart upon extraction so that cartridge 1a;1b may be ejected by falling under the effect of gravity. For instance, cartridge 1a;1b is moved downwards and/or horizontally from the intermediate to the extraction position. Alternatively, a different arrangement for stopping a cartridge in the intermediate position can be used, e.g. which moves out of the cartridge ejection path after urging parts 14,20 together.

Figure 4:
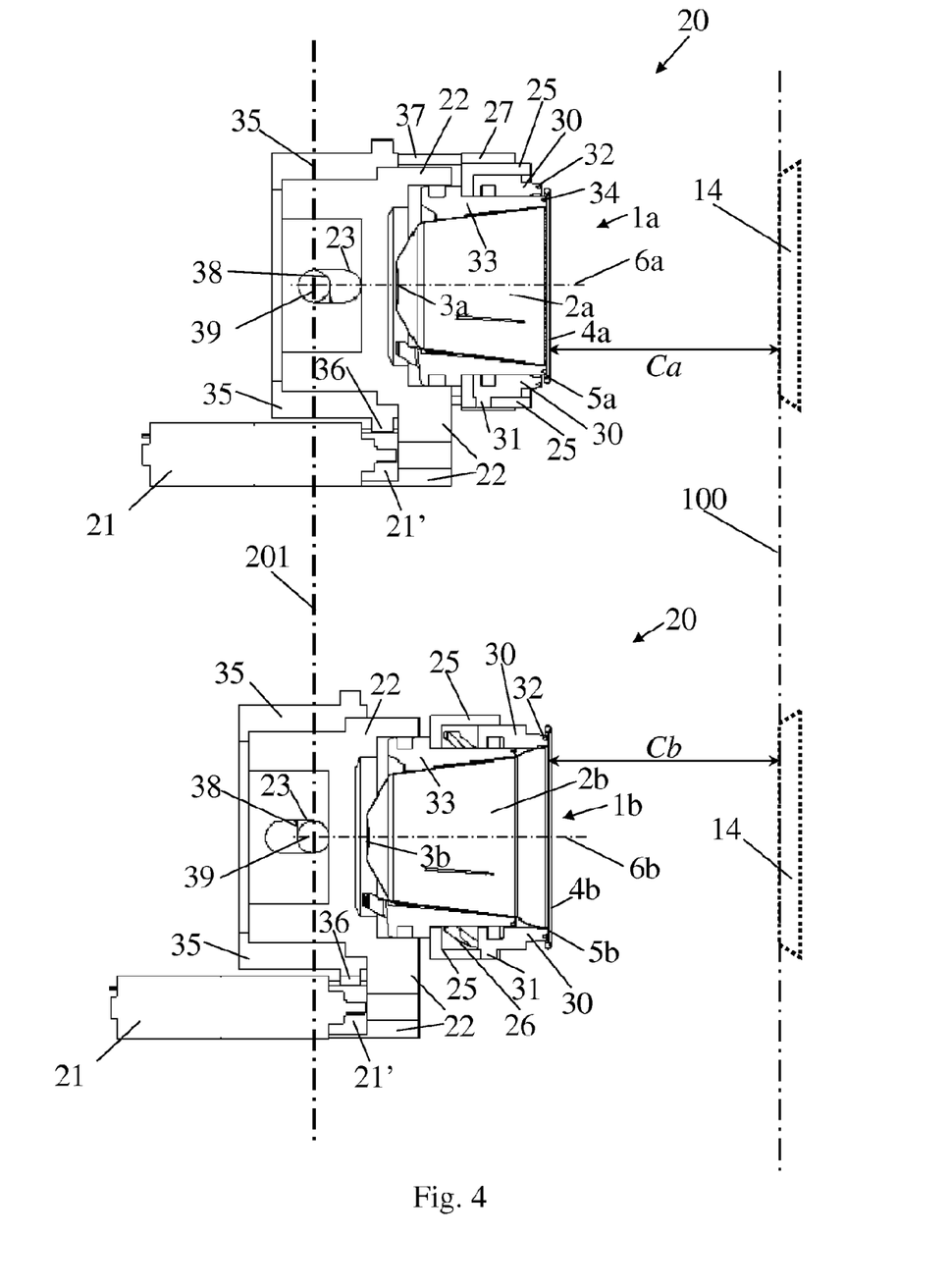
FIGS. 4 and 5 illustrate cross-sectional views of part of a seat of an extraction device for cartridges of different sizes in different configurations according to the invention.
Figure 5:
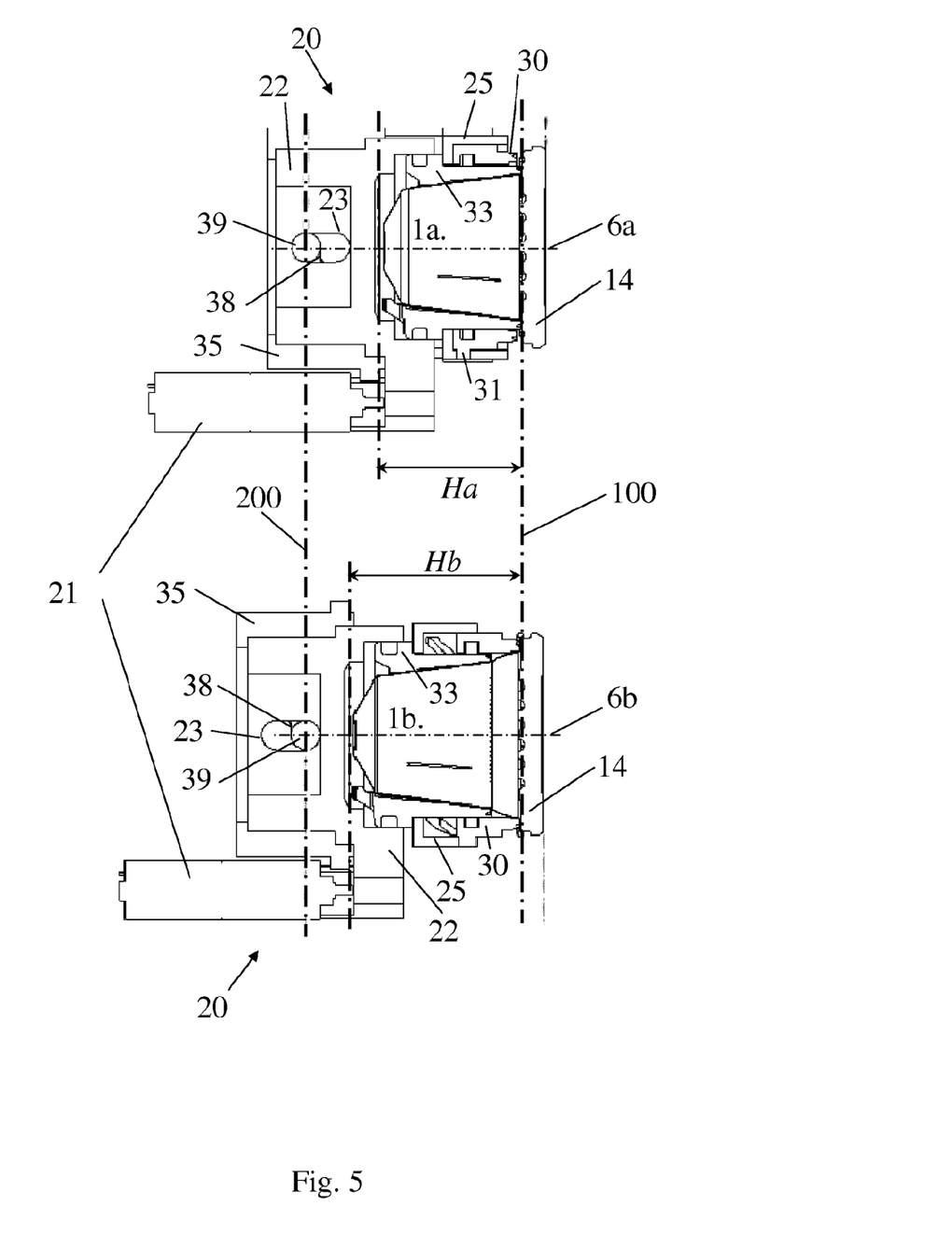
Figure 6A:
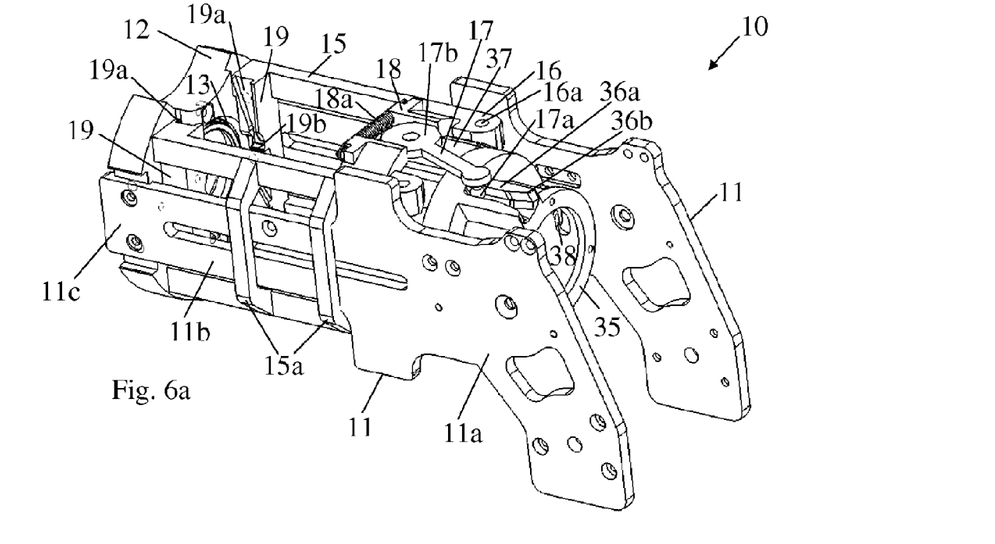
Figure 6B:
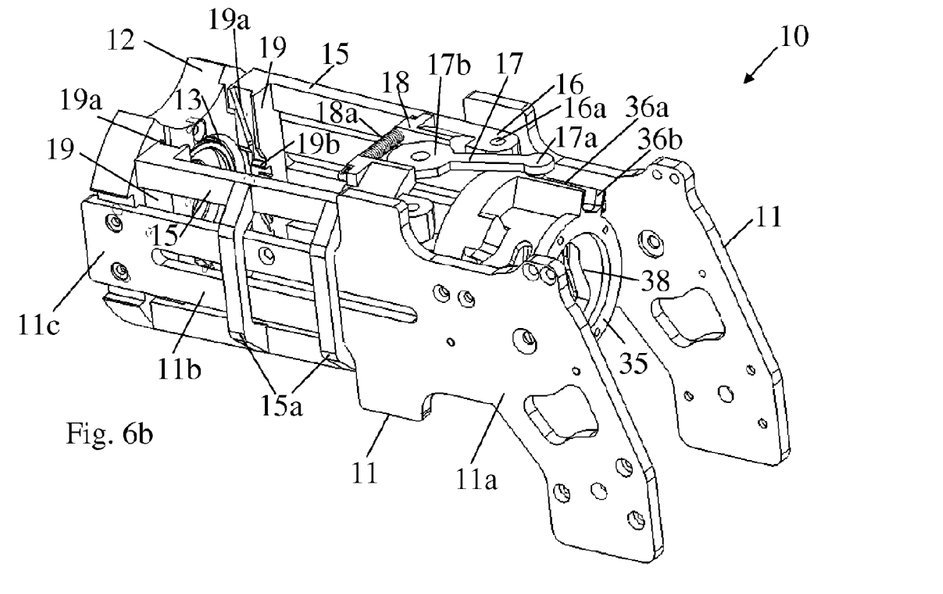
Figure 6C:
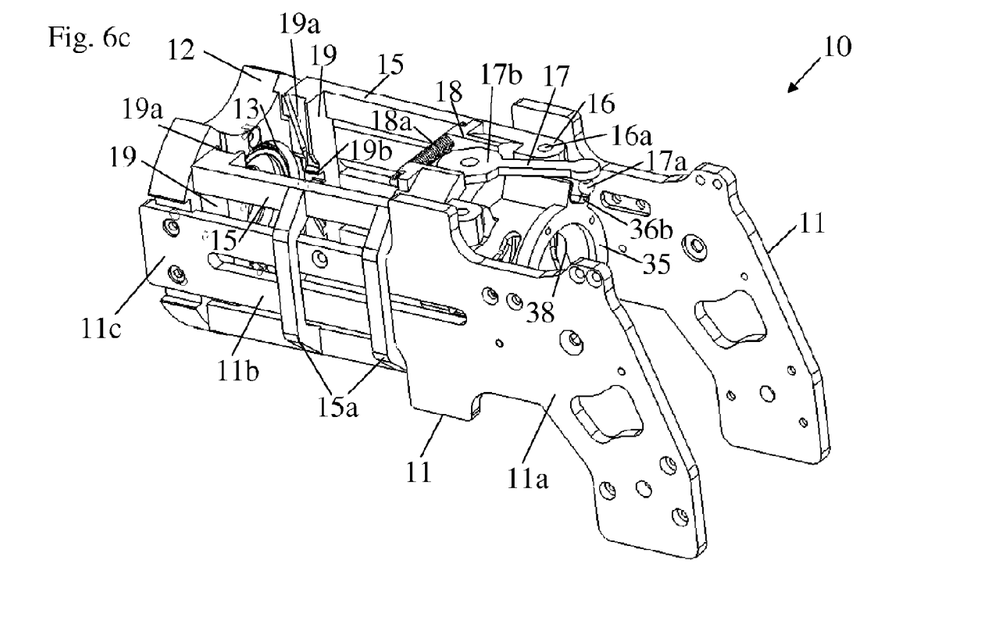

Extraction device 10 is shown in FIG. 4 in its cartridge loading and/or ejection position and in FIG. 5 in its cartridge extraction position. For reasons of comparison with FIG. 5, in FIG. 4 cartridges 1a;1b are illustrated fully received in the a cartridge receptacle formed in member 33. However, in the cartridge loading and/or ejection position of extraction device 10, cartridges 1a;1b would normally not be located in this receptacle. In such a position of extraction device 10, cartridges 1a;1b would rather be located in an area between mouth 32,34 of the receptacle and part 14. In this case, cartridges 1a;1b would be: a) held inbetween mouth 32,34 of the receptacle and part 14 for loading cartridges 1a;1b; and b) released from inbetween mouth 32,34 of the receptacle and part 14 for ejecting (normally downwards) cartridges 1a;1b.

Examples of cartridge handling principles that can be implemented in an extraction unit in accordance with the invention, in particular embodiments of the manner by which the cartridge can be retained in the brewing unit in position before closure, are disclosed in WO 2005/004683, the content of which is hereby included by way of reference.

Slides 19a can be relatively moved to be spaced apart selectively by:
  a first distance Da (FIGS. 6a and 7a) for guiding towards seat 14,20 a first cartridge 1a having cartridge guide 5a of such a first size da (FIG. 1a) as to be in sliding contact with both slides 19a when spaced by first distance Da; and
  a second distance Db (FIGS. 6b and 7b) for guiding towards seat 14,20 a second cartridge 1b having a cartridge guide 5b of such a second size db (FIG. 1b) as to be in sliding contact with both slides 19a when spaced by second distance Db.

First distance Da and first size da are normally different, respectively, to second distance Db and second size db, e.g. Da and da can be smaller than Db and db when cartridge 1a is smaller than cartridge 1b, as illustrated in FIGS. 1a and 1b.

At least one of slides 19a can be part of a member 15 that is movable relative to the other slide by an actuator 17,21,35 in accordance with the size da;db of the cartridge guide 5a;5b of a cartridge 1a;1b to be guided by the slides.

Member 15 can be pivotable about an axis 16a to move slides 19a together and apart. Axis 16a can be generally parallel to a direction of sliding along said slide 19a. Each member 15 can have one or more bows 15a for mounting members 15 on an arm 11b of frame 11.

Actuator 17,21,35 may comprise a cam system 17,18, for instance comprising a pivotable cam 17b acting on a cam follower 18 fixed or integral with member 15. Cam 17b may be in the shape of a pivotably mounted plate having a variable radius to move cam-follower 18 in a position depending on the angular position of cam 17b. Each slide 19a may be delimited by a respective member 15 that has a cam-follower 18, pivotable cam 17b acting on cam 18 of each member 15. The or each cam-follower 18 can be urged against cam 17b by a biasing spring 18a.

For instance, the cam system comprises a transmission member 17 integral or fixed to cam 17b and having a connector 17a engaging with a slide selector 35. Slide selector 35 can be movable, in particular rotatable, between a first selector position (FIGS. 6a and 7a) corresponding to a selection of the first distance Da spacing the slides 19a and a second selector position (FIGS. 6b and 7b) corresponding to a selection of the second distance Db spacing slides 19a. Connector 17a may form a connector pin 17a engaging with a selector channel 36a,36b or forming a connector channel engaging with a selector pin. Selector or connector channel 36a,36b may have a general funnel shape with a larger inlet 36b for facilitating the entry into channel 36a of pin 17a.

Slide selector 35 can be movable, in particular translationally, between an active selector position (FIGS. 6a, 6b and 7a) for selecting selectively first and second distances Da,Db spacing slides 19a and an inactive selector position (FIGS. 6c and 7c) in which slide selector 35 is disengaged from connector 17a of transmission member 17.

Connector 17a may form:
a) a connector pin 17a engaging with a selector channel 36a,36b having an open end 36b:
- out of which connector pin 17a escapes when slide selector 35 is moved to the inactive position; and
- into which the connector pin 17a enters when the slide selector 35 is moved to the active selector position, or (not shown)

b) a connector channel engaging with a selector pin, the connector channel having an open end:
- out of which the selector pin escapes when the slide selector is moved to the inactive position; and
- into which the selector pin enters when the slide selector is moved to the active selector position.

Cartridge seat can be delimited by a first part 20 and second part 14 that are relatively movable between a cartridge extraction position and a cartridge loading and/or ejection position. Parts 14,20 may be moved manually or automatically, e.g. as taught in WO 2005/004683, WO2007/135136, WO 2009/043630, WO 2012/025258 or WO 2012/025259.

One of these delimiting parts 14;20 may comprise slide selector 35. Slide selector 35 may be movable, when the first and second delimiting parts 14;20 are in the loading and/or ejection position, between a first selector position (FIG. 6a) corresponding to a selection of the first distance Da spacing the slides 19a and a second selector position (FIG. 6b) corresponding to a selection of the second distance Db spacing slides 19a.

Cartridge seat can be delimited by a first part 20 and a second part 14 that are relatively movable between a cartridge extraction position (FIG. 5) and a cartridge loading and/or ejection position (FIG. 4) over a closure distance Ca,Cb. As illustrated in FIG. 4, Ca and Cb may generally correspond to the distance between mouth 32,34 of seat 20 and second part 14 when first and second parts 14,20 are in the loading and/or ejection position. At least one of the delimiting parts 14;20, in particular a delimiting part 20 comprising a slide selector 35, may have a first member 30 and a second member 33 that are relatively movable, for instance in a telescopic manner, e.g. by a depth selector 25 (moving between first and second selector positions and vice versa), between:
- a first member position (FIG. 3a and top of FIGS. 4 and 5) delimiting a cartridge cavity (or receptacle) of a first depth Ha for receiving cartridge 1a having first height ha; and
- a second member position (FIG. 3b and bottom of FIGS. 4 and 5) in which the cartridge cavity (or receptacle) has a second depth Hb different to said first depth Ha for receiving cartridge 1b having second height hb different to first height ha.

First member 30 and second member 33 may be configured so that, in the extraction position of extraction unit 10, axis 6a of cartridge 1a in the cartridge cavity of the first member position is generally at the same position as axis 6b of cartridge 1b in the cartridge cavity of the second member position. See FIGS. 4 and 5.

Depth selector 25 can be fixed to or formed integrally with slide selector 35.

At least one of delimiting parts 14;20 may have a shifter 21,35,38 (FIGS. 3a to 9), in particular a motorized shifter 21,35,38 having a motor 21, for compensating a displacement of the first and second members 30,33 between first and second member positions so as to maintain the closure distance Ca for the first member position equal to the closure distance Cb for the second member position. In particular, shifter 21,35,38 comprises a closure selector 35,38 connected to an actuator 39 (FIGS. 3a to 5) for relatively moving first and second parts 14,20 between the cartridge extraction position (FIG. 5) and the cartridge loading and/or ejection position (FIG. 4).

Support 22 may include an opening 23 through or into which actuator 39, e.g. a drive rod or drive pins, may extend. Support 22 may move back and forth relative to actuator 39 along opening 23 between the first and second member positions, as illustrated in FIG. 4. Hence, an extension of one delimiting part 20 towards the other part 14 or a retraction of such delimiting part 20 from the other part 14 may be compensated by a displacement of actuator 39 relative to at least one of parts 14,20 so as to maintain the same closing distance Ca,Cb whether parts 14,20 are in the first member position or in the second member position. In this case, distance Ca,Cb spacing parts 14,20 (with part 14 on reference line 100) in the loading and/or ejection position can remain the same. Likewise, the position of actuator 39 (on reference line 201) may remain the same in the first and second member positions. However, support 22 is moved in a direction opposite to the movement of the mouth 32,34 of part 20 to compensate the displacement of the mouth. Hence, while actuator 39 can remain at the same location in the cartridge loading and/or ejection position, the position of part 20 (in particular support 22) may be adjusted relative to actuator 39 to compensate the displacement the extension or retraction of the receptacle of part 20 for receiving cartridge 1a,1b.

Actuator 39 may be a manual and/or a motorized actuator. A manual actuator is for instance disclosed in WO2007/135136 or in WO 2009/043630. A motorized actuator is for example disclosed in EP1767129 or in WO 2012/025258. For instance, actuator 39 may be driven by a motor that is powered by a power arrangement that also powers motor 21.

Closure selector 35,38 can be rotatably or pivotally mounted in or at a periphery of its delimiting parts 14;20. In particular, the closure selector 35,38 is annularly mounted, e.g. on a support 22. Closure selector 35,38 can have a gear and/or cam transmission, in particular a helicoidal cam 38 cooperating with a cam-follower 39, e.g. actuator 39, for shifting its delimiting part 20 relatively to the other delimiting part 14 and to actuator 39.

Closure selector 35,38 may be fixed to or integral with the depth selector 25,26. For instance, closure selector 35,38 is fixed to the depth selector 25,28 by one or more axially extending peripheral arms 37, such as one or more arms extending over a support 22 of one of said first and second parts 14,20. Such support 22 may serve to support a motor 21 of closure selector 35,38 and depth selector 25,28.

Extraction unit 10 typically comprises an actuator 21,25, in particular a motorized actuator having a motor 21, for relatively moving first and second members 30,33 from the first to the second member position and/or vice versa depending on the dimension da,ha;db,hb of cartridge 1a;1b to be received in seat 30,33,14 and extracted.

Advantageously, shifter 21,35,38 and actuator 21,25 are motorized by the same motor 21.

Actuator 17,21,35 of slides may be coordinated, in particular mechanically and/or electrically, with shifter 21,35,38. Optionally, actuator 17,21,35 of the slides and of the shifter have a common drive arrangement such as a common motor 21.

As illustrated in FIGS. 3a to 5, first member 30 may extend peripherally relatively to second member 33. In particular, the first member extends generally annularly, and is movable, e.g. axially, about or into and out from second member 33 between the first and second member positions.

First member 30 may have a generally cylindrical or frusto-conical or frusto-domical inner surface for receiving large cartridge 1b, when first and second members 30,33 are in the second member position. The inner surface extends typically about section 2b' of large cartridge 1b in the cartridge extraction position. Part 2b' may have an outer shape that generally matches this inner surface or that is confined within such surface.

Second member 33 may have a generally cylindrical or conical or domical inner surface for receiving a correspondingly shaped part 2a,3a;2b,3b of a cartridge 1a; 1b.

Figure 7A:
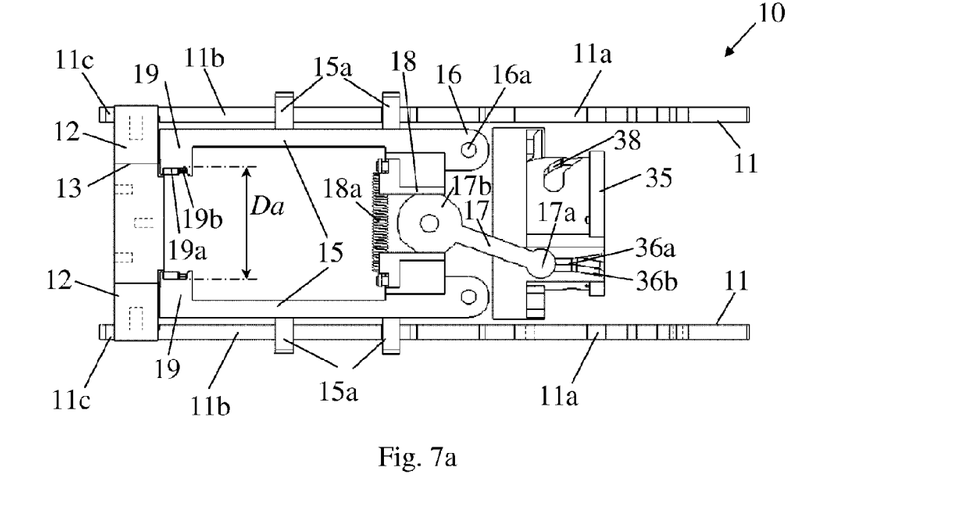
Figure 7B:
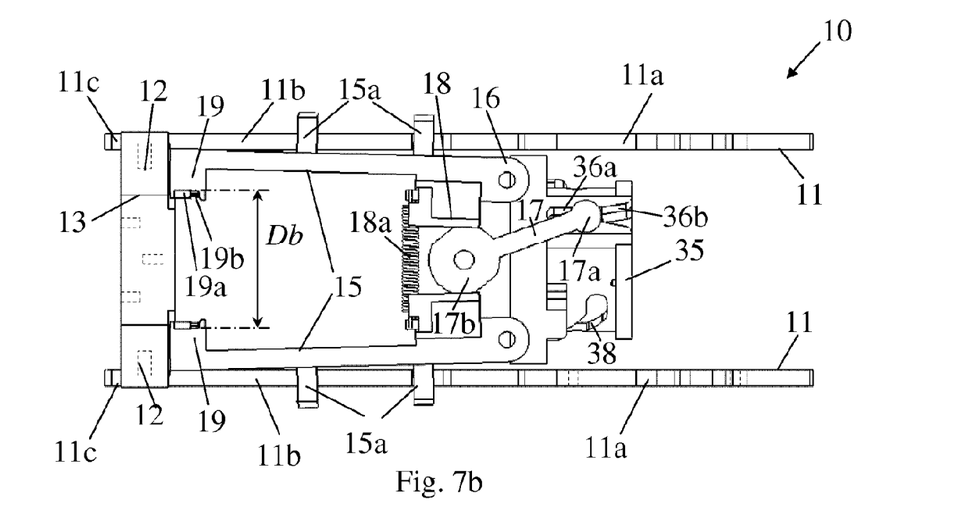
Figure 7C:
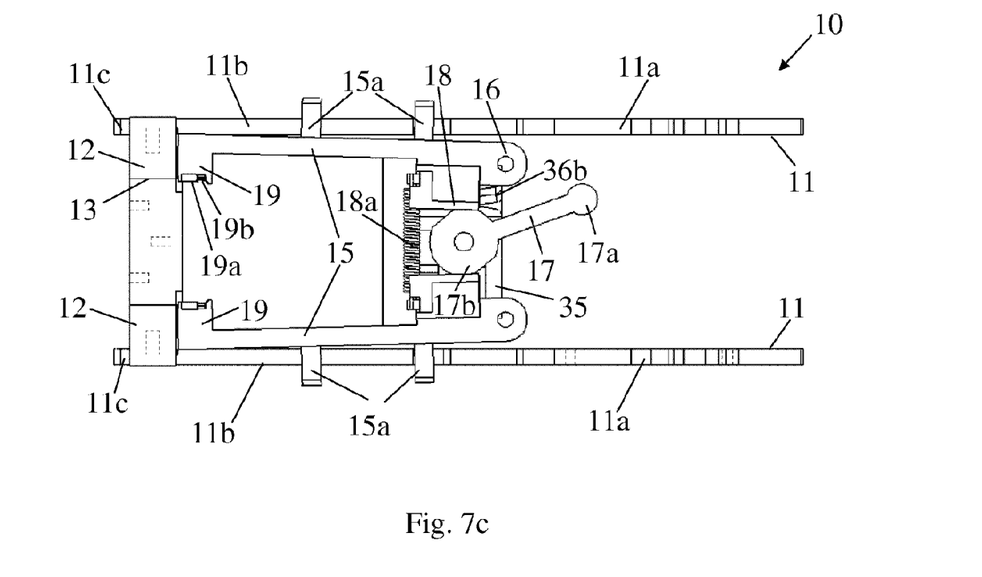
Figure 8:
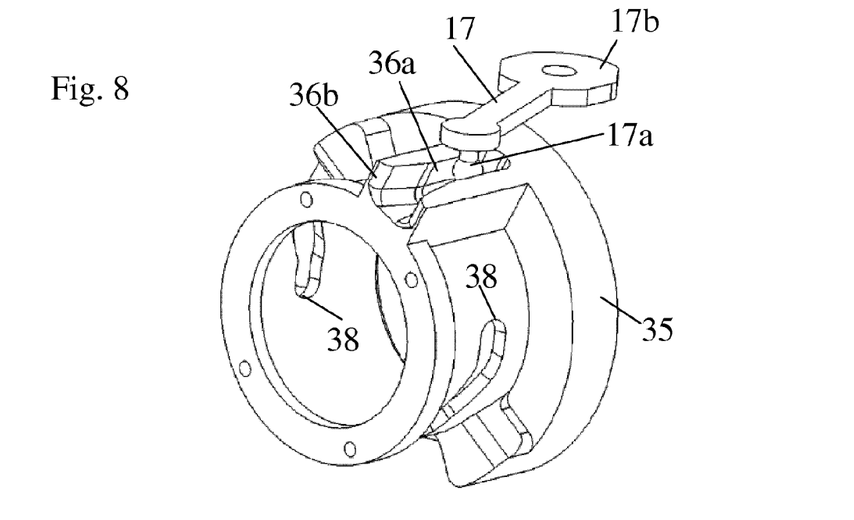
FIGS. 8 and 9 illustrate different elements of the extraction device shown in FIGS. 6a to 7c.

Actuator 21,25 can be configured to relatively move the first and second members 30,33 from the first to the second member position and/or vice versa when first part 30,33 and second part 12,13 are:
in the cartridge loading and/or ejection position (FIGS. 6a, 6b and 7a); or close thereto for instance
at a relative distance of more than 70%, in particular more than 85%, of the distance Ca,Cb spacing the first and second parts 30,33;12,13 in the cartridge loading and/or ejection position (FIGS. 4 and 7b).

Such actuator 21,25 may include a depth selector 25,26 for relatively moving first and second members 30,33 from the first to the second member position and/or vice versa and change the depth of the receptacle for receiving cartridges 1a;1b. Selector 25,26 can be movably mounted, in particular rotatably or pivotally mounted, to one 33 of the first and second members 30,33 and drive the other 30 of the first and second members 30,33 e.g. via a gear and/or cam transmission, in particular via a helicoidal cam 26 cooperating with a cam-follower 31.

Closure selector 35,38 can be fixed to or integral with depth selector 25,26. Closure selector 35,38 may be fixed to the depth selector 25,28 by one or more axially extending peripheral arms 37. Such arm(s) 37 may extend over a support 22 of one 20 of first and second parts 14,20. Support 22 may also serve to support motor 21 of closure selector 35,38 and depth selector 25,28.

Shifter 21,35,38 and actuator 21,25 can advantageously be motorized by the same motor 21.

Likewise, the actuator of the slides 17,21,35 may be coordinated with the actuator 21,25 of first and second members 30,33. In particular, slide actuator 17,21,35 and member actuator 21,25 have a common drive arrangement such as a common motor 21.

In the particular embodiment disclosed in FIGS. 3a to 5, motor 21 is provided to drive:
slides 19a to be spaced apart selectively by first distance Da and second distance Db;
first and second members 30,33 of first delimiting part (20) from the first member position to the second member position, and vice versa; and
at least one of delimiting parts 14,20 for shifting thereof to maintain closure distance Ca;Cb the same in aid first member position and said second member position.

In a variation it is of course possible to use different driving means for driving these three aspects and/or use manual or purely mechanical driving means.

The identification of the relevant dimension da,ha;db,hb of cartridge 1a;1b can be carried out manually or automatically, e.g. by a mechanical, optical, electric, electromechanical, etc . . . sensing system.

Figure 3A:
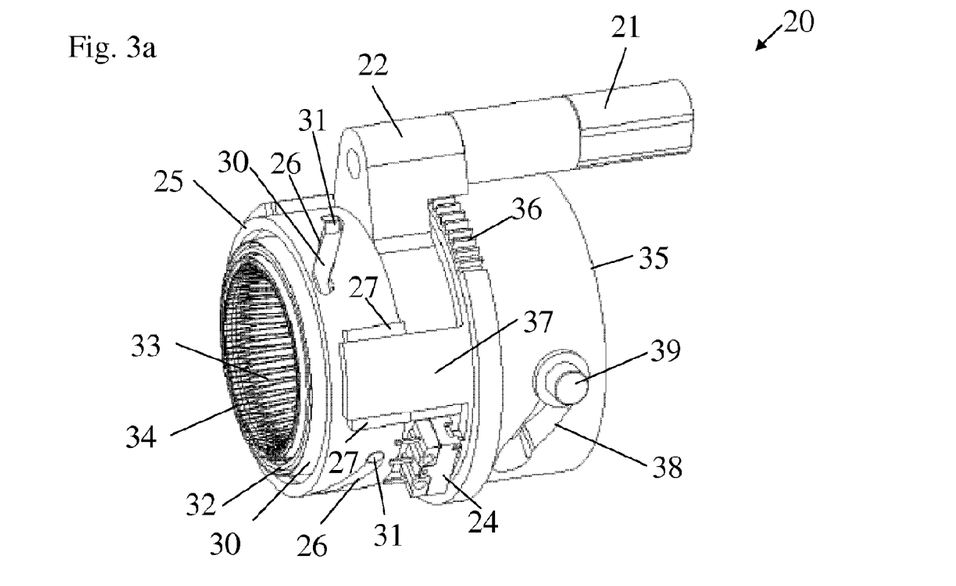
FIGS. 3a and 3b show a delimiting part of a cartridge seat of an extraction in two configurations, i.e. for receiving selectively a small size cartridge and a large size cartridge.
Figure 3B:
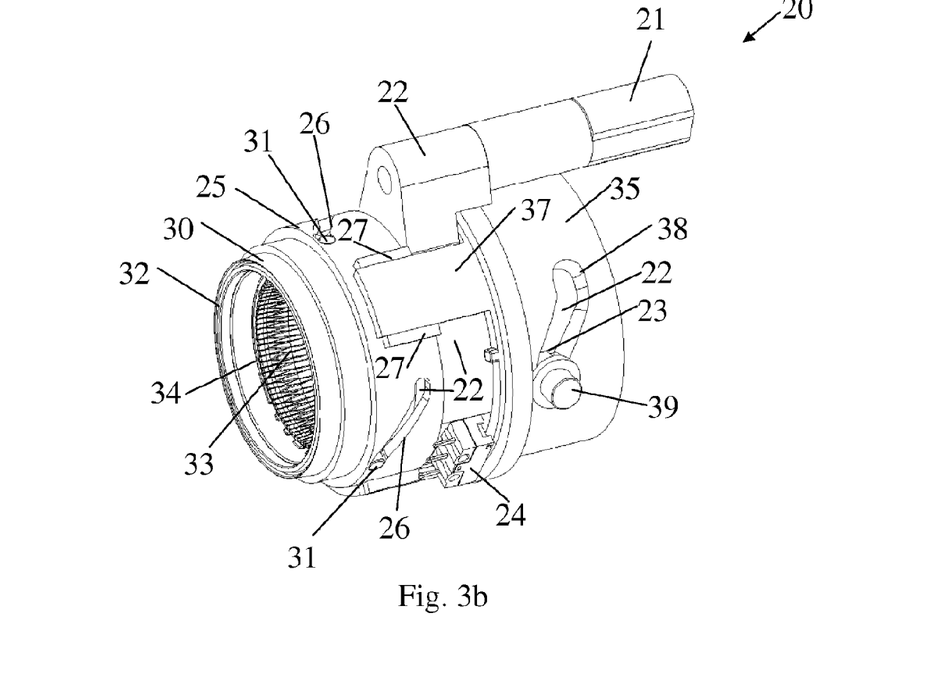

Motor 21 is shown in FIGS. 3a to 4 and hidden in FIGS. 6a to 7c (motor 21 being located below selector 35 in the latter figures).

Motor 21 may be powered by a power supply controlled by an automatic sensing of the dimensions of a cartridge da,ha;db,hb to be used, e.g. by mechanical, optical, electric, electromagnetic sensing. For instance, cartridges of different types are provided with different electric and/or magnetic and/or colour characteristics, e.g. packaging parts of different cartridge types having different characteristics of such nature. For examples, the packaging of the cartridges include metallic parts, e.g. aluminium, that diverge between the cartridge types, such that the types can be recognised from the characteristics. In one embodiment, the size of the metallic parts change between the cartridge types.

As mentioned above and illustrated in FIGS. 3a to 5, motor 21 may be mounted on a support member 22 of part 20. Motor 21 may have a drive axis 21' that engages with a wheel 36, e.g. via a toothed or possibly a friction coupling, of selector 35. Selector 35 may drive selector 25 via a corresponding connection, e.g. arm connection 27,37. Selectors 25,35 may be arranged to turn about support 22, e.g. via a plain bearing. Support 22 may include a switch or other sensor 24 to detect when selectors 25,35 have been driven into a first or second member position or when a first or second depth Ha,Hb has been reached. Such a switch or sensor 24 can be connected to the power supply arrangement of motor 21 so that the arrangement can detect when the motor has reached an end-of-course position.

The invention claimed is:

1. An extraction unit for extracting cartridges of two different dimensions, the extraction unit comprising:
a seat for receiving any of the cartridges for extraction thereof in the seat, the seat defined by a first part and a second part that are relatively movable between a cartridge extraction position and a cartridge loading and/or ejection position; and
a pair of slides for guiding any of the cartridges towards the seat in a sliding contact of each of the slides with a cartridge guide of the cartridge, the slides are configured to guide in sliding contact the cartridge guide in the form of at least one guide edge of the cartridges, the slides have a structure selected from the group consisting of:
each of the slides forms a recess for receiving a guide edge protruding from the cartridges;
each of the slides forms a protrusion for being received in a guide edge recessed in the cartridges; and
one of the slides forms such a recess and another of the slides forms such a protrusion.

2. The unit of claim 1, wherein the slides are relatively movable to be spaced apart selectively by:
a first distance for guiding towards the seat a first cartridge of the cartridges having a cartridge guide of such a first size as to be in sliding contact with both slides when spaced by the first distance; and
a second distance for guiding towards the seat a second cartridge of the cartridges having a cartridge guide of such a second size as to be in sliding contact with both slides when spaced by the second distance,
the first distance and the first size being different, respectively, to the second distance and the second size.

3. The unit of claim 2, wherein at least one of the slides is defined by a member that is movable relative to the other slide by an actuator in accordance with the size of the cartridge guide of a cartridge to be guided by the slides.

4. The unit of claim 3, wherein the member is pivotable about an axis to move the slides together and apart.

5. The unit of claim 3, wherein the actuator comprises a cam system.

6. The unit of claim 5, wherein the cam system comprises a pivotable cam acting on a cam follower fixed or integral with the member.

7. The unit of claim 6, wherein each slide is defined by a respective member that has a cam follower, the pivotable cam acting on the cam of each member.

8. The unit of claim 6, wherein the cam follower is urged against the cam by a biasing spring.

9. The unit of claim 6, wherein the cam system comprises a transmission member integral or fixed to the cam and having a connector engaging with a slide selector.

10. The unit of claim 9, wherein the slide selector is movable between a first selector position corresponding to a selection of the first distance spacing the slides and a second selector position corresponding to a selection of the second distance spacing the slides.

11. The unit of claim 9, wherein the slide selector is movable between an active selector position for selecting selectively the first and second distances spacing the slides and an inactive selector position in which the slide selector is disengaged from the connector of the transmission member.

12. The unit of claim 9, wherein one of the first part and the second part comprises the slide selector.

13. The unit of claim 12, wherein the slide selector is movable, when the first and second parts are in the loading and/or ejection position, between a first selector position corresponding to a selection of the first distance spacing the slides and a second selector position corresponding to a selection of the second distance spacing the slides.

14. The unit of claim 13, wherein the one of the first part and the second part that comprises the slide selector has a first member and a second member that are relatively moved by a depth selector moving between first and second selector positions and vice versa, between:
  a first member position defining a cartridge cavity of a first depth for receiving a cartridge having a first height; and
  a second member position in which the cartridge cavity has a second depth different from the first depth for receiving a cartridge having a second height different from the first height.

15. The unit of claim 14, wherein the first part and the second part are relatively movable between the cartridge extraction position and the cartridge loading and/or ejection position over a closure distance, at least one of the first part or the second part has a first member and a second member that are relatively moved in a telescopic manner between:
  a first member position delimiting a cartridge cavity of a first depth for receiving a cartridge having a first height; and
  a second member position in which the cartridge cavity has a second depth different from the first depth for receiving a cartridge having a second height different from the first height,
  wherein at least one of the first part or the second part has a shifter for compensating a displacement of the first and second members between the first and second member positions to maintain the closure distance for the first member position equal to the closure distance for the second member position.

16. A combination of an extraction unit having a seat and a pair of slides, the extraction unit for extracting cartridges of two different dimensions and comprising a seat for receiving any of the cartridges for extraction thereof in the seat, the seat defined by a first part and a second part that are relatively movable between a cartridge extraction position and a cartridge loading and/or ejection position, and the pair of slides is configured for guiding any of the cartridges towards the seat in a sliding contact of each of the slides with a cartridge guide of the cartridges so that the cartridge is guided by the slides towards the seat in a sliding contact of each of the slides with the cartridge guide of the cartridges, the cartridge guide is in the form of at least one guide edge of the cartridges,
  the slides have a structure selected from the group consisting of:
  each of the slides forms a recess for receiving a guide edge protruding from the cartridges;
  each of the slides forms a protrusion for being received in a guide edge recessed in the cartridges; and
  one of the slides forms such a recess and another of the slides forms such a protrusion.

17. The combination of claim 16, wherein the cartridge has a generally cup-shaped body that is extended on at least one side of the cartridge by a protruding cartridge guide, the cartridges of different dimensions differing by the dimensions of their cartridge guides.

* * * * *